United States Patent
Moriuchi et al.

(10) Patent No.: US 8,696,974 B2
(45) Date of Patent: Apr. 15, 2014

(54) ADHESIVE COMPOSITION, PROCESS FOR PRODUCING THE SAME, MOLDED OBJECTS, AND PROCESS FOR PRODUCING HEAT-SHRINKABLE TUBE

(75) Inventors: Kiyoaki Moriuchi, Osaka (JP); Hiroshi Hayami, Osaka (JP); Shinya Nishikawa, Osaka (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 467 days.

(21) Appl. No.: 12/869,196

(22) Filed: Aug. 26, 2010

(65) Prior Publication Data
US 2010/0320650 A1 Dec. 23, 2010

Related U.S. Application Data

(62) Division of application No. 10/558,758, filed as application No. PCT/JP2004/010350 on Jul. 14, 2004, now abandoned.

(30) Foreign Application Priority Data

Jul. 14, 2003 (JP) .................................. 2003-274333
Mar. 26, 2004 (JP) .................................. 2004-091662

(51) Int. Cl.
*B29C 35/08* (2006.01)
*D01D 5/24* (2006.01)
*B65B 53/00* (2006.01)

(52) U.S. Cl.
USPC ................. 264/477; 264/171.26; 264/173.16; 264/209.1; 264/209.3; 264/331.14; 264/464; 264/470; 264/471; 264/494

(58) Field of Classification Search
USPC ..................... 264/477, 479, 514, 515, 173.12, 264/173.13, 173.15, 209.3, 209.5, 171.26, 264/173.16, 209.1, 331.14, 464, 470, 471, 264/494; 428/34.9
See application file for complete search history.

(56) References Cited

U.S. PATENT DOCUMENTS 3,252,880 A * 5/1966 Magat et al. .................... 522/68
4,035,534 A 7/1977 Nyberg
(Continued)

FOREIGN PATENT DOCUMENTS

EP 0 494 679 A1 7/1992
EP 0 650 987 A1 5/1995
(Continued)

OTHER PUBLICATIONS

Supplementary Partial European Search Report issued in corresponding European Patent Application No. EP 04 74 7766, dated Aug. 11, 2006.
(Continued)

*Primary Examiner* — Atul P. Khare
(74) *Attorney, Agent, or Firm* — McDermott Will & Emery LLP (57) ABSTRACT

An adhesive composition comprising 100 parts by weight of a fluorine-containing polymer and 2 to 30 parts by weight of an unsaturated compound containing at least one polar group selected from the group consisting of an epoxy group and a carboxyl group, wherein the fluorine-containing polymer has been graft-modified with the polar group-containing unsaturated compound by irradiation of ionizing radiation, a production process thereof, and formed products such as a heat-shrinkable tube equipped with a layer composed of the adhesive composition.

10 Claims, 2 Drawing Sheets

(56) References Cited

U.S. PATENT DOCUMENTS

| | | | |
|---|---|---|---|
| 4,129,617 A | 12/1978 | Machi et al. | |
| 5,298,300 A * | 3/1994 | Hosoi et al. | 428/34.9 |
| 5,576,106 A | 11/1996 | Kerbow et al. | |
| 5,736,610 A * | 4/1998 | Nishi et al. | 525/276 |
| 5,756,199 A | 5/1998 | Kerbow et al. | |
| 5,858,540 A * | 1/1999 | Hayami et al. | 428/421 |
| 5,965,275 A * | 10/1999 | Nishi et al. | 428/475.8 |
| 6,306,954 B1 * | 10/2001 | Nishikawa et al. | 524/514 |
| 2002/0104575 A1 | 8/2002 | Nishi et al. | |
| 2003/0026926 A1 * | 2/2003 | Muto et al. | 428/34.9 |
| 2003/0204006 A1 * | 10/2003 | Moriuchi et al. | 524/436 |

FOREIGN PATENT DOCUMENTS

| | | | |
|---|---|---|---|
| EP | 650987 A1 * | 5/1995 | |
| EP | 1 217 278 A1 | 6/2002 | |
| GB | 1 255 493 | 12/1971 | |
| JP | 50-41791 | 4/1975 | |
| JP | 57-073027 A | 5/1982 | |
| JP | 61-40152 | 2/1986 | |
| JP | 01-255522 | 10/1989 | |
| JP | 3-163182 A | 7/1991 | |
| JP | 5-57791 | 3/1993 | |
| JP | 6-275136 A | 9/1994 | |
| JP | 07-173447 A | 7/1995 | |
| JP | 10-306265 A | 11/1998 | |
| JP | 2000-119403 A | 4/2000 | |
| JP | 2003-2930 A | 1/2003 | |
| WO | WO 9850479 A1 * | 11/1998 | |
| WO | WO 01/23795 A1 | 4/2001 | |

OTHER PUBLICATIONS

Japanese Notice of Preliminary Rejection issued in Japanese Patent Application No. JP 2004-091662 dated Jul. 20, 2010.

* cited by examiner

Fig. 4

ADHESIVE COMPOSITION, PROCESS FOR PRODUCING THE SAME, MOLDED OBJECTS, AND PROCESS FOR PRODUCING HEAT-SHRINKABLE TUBE

RELATED APPLICATIONS

This application is a Divisional of U.S. patent application Ser. No. 10/558,758, filed on Dec. 1, 2005 now abandoned, which is a U.S. National Phase under 35 U.S.C. §371 of International Application No. PCT/JP2004/010350, filed on Jul. 14, 2004, which in turn claims the benefit of Japanese Application Nos. 2003-274333, filed on Jul. 14, 2003 and 2004-091662, filed on Mar. 26, 2004, the entire contents of each of which are hereby incorporated by reference.

TECHNICAL FIELD

The present invention relates to an adhesive composition that can be hot-melted and is excellent in adhesive property to metallic adherends and heat resistance, and formed products on which an adhesive layer composed of the adhesive composition has been arranged. Of the formed products are representative multi-layer heat-shrinkable tubes and heat-shrinkable caps of a structure that the adhesive layer has been arranged on internal surfaces thereof. The present invention also relates to production processes of the adhesive composition and multi-layer heat-shrinkable tubes.

The adhesive composition, and multi-layer heat-shrinkable tubes and heat-shrinkable caps according to the present invention can be suitably applied to protection of electric wires, wire harnesses and pipes, of which high heat resistance that a continuous service temperature is at least 150° C. is required, and hermetic sealing of joints and ends.

BACKGROUND ART

Respective members such as electric wires, wire harnesses and pipes, which are arranged in automobiles, aerospace equipments or the like, are used under a high-temperature environment, so that adhesive materials used in protection, connection, hermetic sealing or the like thereof are required to have high heat resistance that a continuous service temperature is at least 150° C.

For example, a heat-shrinkable tube, on the internal surface of which a hot-melt adhesive layer has been arranged, is used in binding and connection of wire harnesses used in an automobile, or protection of a branched portion from the viewpoints of insulating property and waterproofness. The heat-shrinkable tube, on the internal surface of which the hot-melt adhesive layer has been arranged, is also used for improving the anticorrosion of a hydraulic piping composed of copper, iron, stainless steel or the like and the waterproofness of a joint.

In the heat-shrinkable tube, on the internal surface of which the hot-melt adhesive layer has been arranged, the hot-melt adhesive is melted to be filled in a space between the surface of an adherend and the heat-shrinkable tube and bonded to the adherend when the heat-shrinkable tube is heated and shrunk to bring it into close contact with the periphery of the adherend, whereby penetration of water and corrosive gases from an end of the heat-shrinkable tube is prevented, thereby exhibiting waterproofness and anticorrosion.

As a material for forming a heat-shrinkable tube body, has heretofore been used, for example, polystyrene, polyvinyl chloride, crosslinked polyethylene, fluororesin or fluororubber. A heat-shrinkable tube composed of a fluorine-containing polymer such as a fluororesin or fluororubber is generally used in uses of which high heat resistance that a continuous service temperature is at least 150° C. is required.

Adhesive compositions comprising, as a principal component, a polyamide resin such as a dimer acid type polyamide resin, polyamide 6, polyamide 10 or polyamide 11 are representative of the hot-melt adhesive arranged on the internal surface of the heat-shrinkable tube. These hot-melt adhesives are coated on the internal surface of the heat-shrinkable tube. However, the continuous service temperature of these hot-melt adhesives is at most about 105° C., so that they cannot be applied to uses of which high heat resistance that a continuous service temperature is at least 150 is required. In other words, when a conventional heat-shrinkable tube is held for along period of time under high-temperature conditions of at least 150° C. in a state that it has been brought into close contact with the periphery of an adherend, its adhesion strength to the adherend is lowered.

There has heretofore been proposed a heat-shrinkable tube of a 2-layer structure that a layer of a fluororesin composition having a low melting point and high flowability is arranged on an internal surface of a crosslinked heat-shrinkable tube composed of a fluororesin (Japanese Patent Application Laid-Open No. 5-57791). According to this heat-shrinkable tube, the fluororesin composition of the internal layer can be melted upon the shrinkage under heating to be filled in a space between an adherend and the heat-shrinkable tube. However, the fluororesin composition does not have adhesive property, so that the heat-shrinkable tube may not be satisfactory in that the function of being bonded to the adherend to improve waterproofness and anticorrosion is exhibited.

DISCLOSURE OF THE INVENTION

It is an object of the present invention to provide an adhesive composition that can be hot-melted and is excellent in adhesive property to various adherends such as metallic adherends (including adherends having a metallic surface layer) and heat resistance.

Another object of the present invention is to provide a formed product on which an adhesive layer composed of an adhesive composition that can be hot-melted and is excellent in adhesive property to various adherends including metallic adherends and heat resistance has been arranged.

A particular object of the present invention is to provide a multi-layer heat-shrinkable tube and a multi-layer heat-shrinkable cap of a structure that an adhesive layer composed of an adhesive composition excellent in adhesive property to various adherends including metallic adherends and heat resistance has been arranged on internal surfaces thereof.

A further object of the present invention is to provide production processes of the adhesive composition and multi-layer heat-shrinkable tube.

The present inventors have carried out an extensive investigation with a view toward achieving the above objects. As a result, it has been found that an unsaturated compound containing at least one polar group selected from the group consisting of an epoxy group and a carboxyl group is incorporated into a fluorine-containing polymer such as a fluororesin or fluororubber, and the resultant fluorine-containing polymer composition is irradiated with ionizing radiation to graft-modify the fluorine-containing polymer with the polar group-containing unsaturated compound, thereby providing an adhesive composition that can be hot-melted, is excellent in adhesive property to various adherends including metallic adherends and has high heat resistance that a continuous service temperature is at least 150° C.

The adhesive composition according to the present invention can be arranged as an adhesive layer on a desired position of a formed product such as a heat-shrinkable tube. In particular, a heat-shrinkable tube of a multi-layer structure that a layer of the adhesive composition has been formed on an internal surface of a heat-shrinkable rube formed from a radiation-crosslinking composition comprising a fluorine-containing polymer and a polyfunctional monomer permits hot-melting the adhesive composition under heating conditions for heat shrinkage to be filled in a space between an adherend and the heat-shrinkable tube and moreover is excellent in adhesive property of the adhesive composition to the adherend, so that it can markedly improve the waterproofness and anticorrosion of various adherends including metallic adherends.

One opening end of the heat-shrinkable tube having such a layer structure is heat-shrunk to form a structure that the end has been sealed with the molten adhesive composition, whereby a heat-shrinkable cap can be provided. The heat-shrinkable cap according to the present invention may be suitably used in hermetic sealing of end portions of electric wires, wire harnesses or the like.

The present invention has been led to completion on the basis of these findings.

According to the present invention, there is thus provided an adhesive composition comprising 100 parts by weight of a fluorine-containing polymer and 2 to 30 parts by weight of an unsaturated compound containing at least one polar group selected from the group consisting of an epoxy group and a carboxyl group, wherein the fluorine-containing polymer has been graft-modified with the polar group-containing unsaturated compound by irradiation of ionizing radiation.

According to the present invention, there is also provided a formed product on a desired position of which an adhesive layer composed of the above-described adhesive composition has been arranged. According to the present invention, there is particularly provided a multi-layer heat-shrinkable tube having a structure that an adhesive layer composed of the above-described adhesive composition has been arranged on an internal surface of a heat-shrinkable tube.

According to the present invention, there is further provided a heat-shrinkable cap having a structure that an adhesive layer composed of the above-described adhesive composition has been arranged on an internal surface of a heat-shrinkable tube, and one opening end of the heat-shrinkable tube has been shrunk by heat shrinkage to seal the end with the molten adhesive composition.

According to the present invention, there is still further provided a process for producing an adhesive composition comprising a fluorine-containing polymer, which comprises the following steps i and ii:
(i) Step i of incorporating 2 to 30 parts by weight of an unsaturated compound containing at least one polar group selected from the group consisting of an epoxy group and a carboxyl group into 100 parts by weight of the fluorine-containing polymer to prepare a fluorine-containing polymer composition; and
(ii) Step ii of forming the composition into a desired shape as needed, and then irradiating the composition with ionizing radiation to graft-modify the fluorine-containing polymer with the polar group-containing unsaturated compound.

According to the present invention, there is yet still further provided a process for producing a multi-layer heat-shrinkable tube having an adhesive layer on an internal surface thereof, which comprises the following steps 1 to 4:
(1) Step 1 of co-extruding a radiation-crosslinking composition comprising a fluorine-containing polymer and a polyfunctional monomer and a fluorine-containing polymer composition comprising 100 parts by weight of a fluorine-containing polymer and 2 to 30 parts by weight of an unsaturated compound containing at least one polar group selected from the group consisting of an epoxy group and a carboxyl group to form a tube-like formed product of a 2-layer structure having an outer layer composed of the radiation-crosslinking composition and an inner layer composed of the fluorine-containing polymer composition;
(2) Step 2 of irradiating the tube-like formed product with ionizing radiation to crosslink the radiation-crosslinking composition of the outer layer and graft-modify the fluorine-containing polymer composition of the inner layer;
(3) Step 3 of expanding the tube-like formed product in a radial direction thereof under heating; and
(4) Step 4 of cooling the tube-like formed product to fix the form expanded in the radial direction.

BEST MODE FOR CARRYING OUT THE INVENTION

1. Adhesive Composition

In the present invention, as a polymer base of an adhesive composition, is used at least one fluorine-containing polymer selected from the group consisting of fluororesins and fluororubbers.

Examples of the fluororesins include thermoplastic fluororesins, such as polyvinylidene fluoride (PVdF) that is a homopolymer of vinylidene fluoride (VdF); binary or ternary PVdF copolymers (for example, VdF-TFE copolymers, VdF-HFP copolymers, VdF-TFE-HFP terpolymers) of vinylidene fluoride (VdF) and tetrafluoroethylene (TFE) and/or hexafluoropropylene (HFP); copolymers (ETFEs) of ethylene and TFE, and ternary ETFEs with a third component additionally added thereto; copolymers (ECTFEs) of ethylene and chlorotrifluoroethylene (CTFE), and ternary ECTFEs with a third component added thereto; FEPs that are copolymers of TFE and HFP; and PFAs that are copolymers of TFE and a perfluoroalkyl vinyl ether such as perfluoromethyl vinyl ether (PFMVE).

Examples of the fluororubbers include vinylidene fluoride-containing fluororubbers (FKMs) (for example, VdF-HFP fluororubber, VdF-HFP-TFE fluororubber, VdF-PFP fluororubber, VdF-PFP-TFE fluororubber, VdF-PFMVF-TFE fluororubber, and VdF-CTFE fluororubber) with vinylidene fluoride (VdF) copolymerized with any of hexafluoropropylene (HFP), tetrafluoroethylene (TFE), pentafluoropropylene (PFP), perfluoromethyl vinyl ether (PFMVE) and chlorotrifluoroethylene (CTFE); and tetrafluoroethylene-propylene fluororubber (TFE-P) of TFE and propylene, and TFE-P-containing fluororubbers with a third component added to TFE-P. In addition, a thermoplastic fluororubber comprising a fluororubber that is a soft segment and a thermoplastic fluororesin that is a hard segment may also be used.

The fluororesins and fluororubbers may be used either singly or in any combination thereof. A blend of the fluororesin and fluororubber may be used. When the fluororesin is blended with the fluororubber, a proportion of both components blended may be changed within a weight ratio range of preferably from 5:95 to 95:5, more preferably from 10:90 to 90:10. Other thermoplastic resins, rubbers and thermoplastic elastomers may be blended with the fluorine-containing polymer, as needed, within limits not impairing heat resistance and adhesive property.

In the present invention, an unsaturated compound (hereinafter abbreviated as "polar group-containing unsaturated compound") containing at least one polar group selected from the group consisting of an epoxy group and a carboxyl group is used to graft-modify the fluorine-containing polymer.

Examples of the epoxy group-containing unsaturated compounds include glycidyl esters of unsaturated carboxylic acids, such as glycidyl acrylate, glycidyl methacrylate and glycidyl p-styrylcarboxylate; allylglycidyl isocyanates such as diallylmonoglycidyl isocyanate and monoallyl-diglycidyl isocyanate; monoglycidyl esters or polyglycidyl esters of unsaturated polycarboxylic acids, such as endo-bicyclo[2,2,1]hept-5-ene-2,3-dicarboxylic acid and endo-cis-bicyclo[2,2,1]hept-5-ene-2-methyl-2,3-dicarboxylic acid; unsaturated glycidyl ethers (ally glycidyl ethers) such as allyl glycidyl ether, 2-methylallyl glycidyl ether, glycidyl ether of o-allylphenol, glycidyl ether of m-allylphenol and glycidyl ether of p-allylphenol; and 2-(o-vinylphenyl)ethylene oxide, 2-(p-vinylphenyl)ethylene oxide, 2-(o-allylphenyl)ethylene oxide, 2-(p-allylphenyl)ethylene oxide, 2-(o-vinylphenyl)propylene oxide, 2-(p-vinylphenyl)propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexane monoxide, and allyl-2,3-epoxycyclopentyl ether.

The epoxy group-containing unsaturated compounds are not limited to the above-described compounds so far as they are compounds having at least one epoxy group and a polymerizable carbon-carbon unsaturated bond in their chemical structures.

Among these epoxy group-containing unsaturated compounds, glycidyl esters of unsaturated carboxylic acids, allylglycidyl isocyanates, monoglycidyl or polyglycidyl esters of unsaturated polycarboxylic acids and allyl glycidyl ethers are preferred in that graft addition can be conducted at a high rate of reaction by irradiation of ionizing radiation, with glycidyl esters of unsaturated carboxylic acids and allylglycidyl isocyanates being more preferred. Among these, glycidyl methacrylate and diallylmonoglycidyl isocyanate are particularly preferred. The epoxy group-containing unsaturated compounds may be used either singly or in any combination thereof.

Examples of the carboxyl group-containing unsaturated compounds include unsaturated carboxylic acids such as acrylic acid, methacrylic acid, crotonic acid, maleic acid, fumaric acid and itaconic acid; anhydrides of unsaturated dicarboxylic acids, such as maleic anhydride, itaconic anhydride and succinic anhydride; and anhydrides of unsaturated carboxylic acids, such as crotonic anhydride. Accordingly, the carboxyl group-containing unsaturated compounds used in the present invention include unsaturated carboxylic acid derivatives such as acid anhydrides in addition to unsaturated carboxylic acids. Other unsaturated carboxylic acid derivatives than the acid anhydrides include halides, amides, imides and esters of unsaturated carboxylic acids.

The carboxyl group-containing unsaturated compounds are not limited to the above-described compounds so far as they are compounds having at least one carboxyl group (including acid anhydride group or the like) and a polymerizable carbon-carbon unsaturated bond in their chemical structures.

The carboxyl group-containing unsaturated compounds may be used either singly or in any combination thereof. Among the carboxyl group-containing unsaturated compounds, compounds having an anhydride and a carbon-carbon double bond are preferred in that graft addition can be conducted at a relatively high rate of reaction by irradiation of ionizing radiation. Among those compounds, maleic anhydride is particularly preferred.

The carboxyl group-containing unsaturated compound and the epoxy group-containing unsaturated compound may be used in combination if desired.

The polar group-containing unsaturated compound is used in a proportion of 2 to 30 parts by weight, preferably 2.5 to 25 parts by weight per 100 parts by weight of the fluorine-containing polymer. If the proportion of the polar group-containing unsaturated compound blended is too low or too high, the adhesive property of the resulting adhesive composition to metals is deteriorated in any case.

Examples of the ionizing radiation include electron rays, $\gamma$-rays, X-rays, $\alpha$-rays and ultraviolet rays. Electron rays and $\gamma$-rays are preferred from the viewpoints of transmission thickness of the ionizing radiation and industrial utilization such as reaction velocity of grafting, with accelerated electron rays by applying acceleration voltage to conduct irradiation being particularly preferred.

The fluorine-containing polymer composition comprising the fluorine-containing polymer and the unsaturated compound containing at least one polar group selected from the group consisting of an epoxy group and a carboxyl group is irradiated with ionizing radiation to graft the polar group-containing unsaturated compound on the fluorine-containing polymer. The fluorine-containing polymer graft-modified can be given adhesive property to metals or the like and can exhibit melt flowability by heating.

The quantity of the ionizing radiation irradiated is preferably within a range of 20 to 700 kGy. If the quantity of the ionizing radiation irradiated is smaller than 20 kGy, the initial adhesive property of the resulting adhesive composition is deteriorated. If the quantity exceeds 700 kGy, decomposition of the adhesive resin composition becomes marked to impair the heat resistance of the resulting adhesive composition. It is hence not preferable to irradiate the polymer composition with the ionizing radiation in such a too small or too great quantity. The degree of the graft modification by the polar group-containing unsaturated compound can be controlled by adjusting the proportion of the polar group-containing unsaturated compound blended to the fluorine-containing polymer and the quantity of the ionizing radiation irradiated.

Into the adhesive composition, as needed, may be incorporated fillers such as inorganic fillers, antioxidants, stabilizers, lubricants, ultraviolet absorbents, light stabilizers, copper inhibitors, cross linking agents, cross linking aids, cross linking inhibitors, vulcanizing agents, vulcanization accelerators, scorch retarders, antiozonants, silicones, plasticizers, softeners, foaming agents, preservatives, etc.

An antioxidant is preferably incorporated from the viewpoint of improving the heat stability of the adhesive composition. As examples of the antioxidant, may be mentioned pentaerythritol-tetrakis[3-(3,5-di-t-butyl-4-hydroxyphenyl)propionate], tetrakis-[methylene-3-(3',5'-di-t-butyl-4'-hydroxyphenyl)propionate]methane, 1,1,3-tris-(2-methyl-4-hydroxy-5-t-butylphenyl)butane, 4,4'-butylidene-bis(3-methyl-6-t-butylphenol), and tris(3,5-di-t-butyl-4-hydroxybenzyl) isocyanurate.

The antioxidant is used in a proportion of generally 0.1 to 5 parts by weight, preferably 0.2 to 3 parts by weight, more preferably 0.3 to 2 parts by weight per 100 parts by weight of the fluorine-containing polymer.

The fluorine-containing polymer composition comprising the fluorine-containing polymer and the unsaturated compound containing at least one polar group selected from the group consisting of an epoxy group and a carboxyl group is irradiated with the ionizing radiation. As needed, the fluorine-containing polymer composition may be preformed into a sheet, film, coating layer (coating film) or any other form before the irradiation. For example, a film formed from the fluorine-containing polymer composition is irradiated with the ionizing radiation, whereby a dry film having adhesive property can be obtained. Such a dry film may be caused to act as an adhesive film by interposing it between, for example, a metallic adherend and another article and heating and pressurizing them.

A layer of the fluorine-containing polymer composition is arranged on an internal surface of a heat-shrinkable tube and irradiated with the ionizing radiation, whereby a multi-layer heat-shrinkable tube having the adhesive composition layer having adhesive property and melt flowability (hot-melt property) is obtained.

The process according to the present invention for producing the adhesive composition comprising the fluorine-containing polymer comprises the following steps i and ii:

(i) Step i of incorporating 2 to 30 parts by weight of an unsaturated compound containing at least one polar group selected from the group consisting of an epoxy group and a carboxyl group into 100 parts by weight of the fluorine-containing polymer to prepare a fluorine-containing polymer composition; and (ii) Step ii of forming the composition into a desired shape as needed, and then irradiating the composition with ionizing radiation to graft-modify the fluorine-containing polymer with the polar group-containing unsaturated compound.

The quantity of the ionizing radiation irradiated is preferably within the above-described range.

The initial adhesion strength of the adhesive composition according to the present invention to a stainless steel plate, a copper plate, an iron plate and an aluminum plate in "test for initial adhesion strength to metal plates" by a T-shape peeling test (rate of pulling: 50 mm/min), which will be described in Example 1, is at least 1.0 kg/cm in any case, and adhesive strength to each plate after subjected to accelerated deterioration under conditions of 3,000 hours in a gear oven of 150° C. is also at least 1.0 kg/cm. The adhesive composition has a continuous service temperature of at least 150° C.

2. Formed Product

The formed product according to the present invention is such that an adhesive layer formed of the adhesive composition described above is arranged on a desired position of a formed product. No particular limitation is imposed on the shape and material of the formed product. However, it is preferably a formed product of a synthetic resin, more preferably a formed product composed of a fluorine-containing polymer.

As specific examples of the formed product, on which the adhesive layer has been arranged, may be mentioned multi-layer heat-shrinkable tubes having a structure that an adhesive layer formed of the adhesive composition described above has been formed on an internal surface of a heat-shrinkable rube. No particular limitation is imposed on the heat-shrinkable tube. However, that obtained by forming a radiation-crosslinking composition comprising a fluorine-containing polymer and a polyfunctional monomer into a tube and irradiating the composition with ionizing radiation to crosslink it is preferred.

As other specific examples of the formed product, on which the adhesive layer has been arranged, may be mentioned heat-shrinkable caps having a structure that an adhesive layer formed of the adhesive composition described above has been formed on an internal surface of a heat-shrinkable tube, and one opening end of the heat-shrinkable tube has been shrunk by heat shrinkage to seal the end with the molten adhesive composition.

The process according to the present invention for producing the multi-layer heat-shrinkable tube having an adhesive layer on an internal surface thereof comprises the following steps 1 to 4:

(1) Step 1 of co-extruding a radiation-crosslinking composition comprising a fluorine-containing polymer and a polyfunctional monomer and a fluorine-containing polymer composition comprising 100 parts by weight of a fluorine-containing polymer and 2 to 30 parts by weight of an unsaturated compound containing at least one polar group selected from the group consisting of an epoxy group and a carboxyl group to form a tube-like formed product of a 2-layer structure having an outer layer composed of the radiation-crosslinking composition and an inner layer composed of the fluorine-containing polymer composition;

(2) Step 2 of irradiating the tube-like formed product with ionizing radiation to crosslink the radiation-crosslinking composition of the outer layer and graft-modify the fluorine-containing polymer composition of the inner layer;

(3) Step 3 of expanding the tube-like formed product in a radial direction thereof under heating; and (4) Step 4 of cooling the tube-like formed product to fix the form expanded in the radial direction.

As the fluorine-containing polymer forming the body (outer layer) of the heat-shrinkable tube, may be used the same fluorine-containing polymer as that used for producing the adhesive composition. Among these polymers, a fluororesin or fluororubber containing a vinylidene fluoride unit is preferred.

As examples of such fluororesin or fluororubber, may be mentioned polyvinylidene fluoride (PVdF) that is a homopolymer of vinylidene fluoride (VdF); and binary or ternary PVdF copolymers (for example, VdF-TFE copolymers, VdF-HFP copolymers, VdF-TFE-HFP terpolymers) of vinylidene fluoride (VdF) and tetrafluoroethylene (TFE) and/or hexafluoropropylene (HFP). The vinylidene fluoride unit in the PVdF copolymer is preferably contained in a proportion of at least 60% by weight, more preferably at least 65% by weight, particularly preferably at least 70% by weight.

The polyfunctional monomer is a compound at least 2 polymerizable carbon-carbon double bonds. Specific examples of the polyfunctional monomer include allyl compounds such as diallyl phthalate, triallyl cyanurate and triallyl isocyanurate; methacrylate compounds such as ethylene glycol dimethacrylate, trimethylolpropane trimethacrylate, trimethylolethane methacrylate, trimethylolpropane acrylate, trimethylolpropane methacrylate, trimethylolethane triacrylate and tetramethylolmethane tetraacrylate; and vinyl compounds such as divinylbenzene.

Among these polyfunctional monomers, trimethylolpropane trimethacrylate and triallyl isocyanurate are preferred from the viewpoints of crosslinking property, heat resistance and dispersibility in the fluorine-containing polymer.

The polyfunctional monomers may be used either singly or in any combination thereof. The polyfunctional monomer may be used in a proportion of preferably 0.1 to 20 parts by weight, more preferably 0.3 to 10 parts by weight, particularly preferably 0.5 to 5 parts by weight per 100 parts by weight of the fluorine-containing polymer.

As a preferable process for producing the multi-layer heat-shrinkable tube, a radiation-crosslinking composition (A) comprising the fluorine-containing polymer and the polyfunctional monomer and a fluorine-containing polymer composition (B) comprising the fluorine-containing polymer and the polar group-containing unsaturated compound are first co-extruded to form a tube-like formed product of a 2-layer structure having an outer layer composed of the radiation-crosslinking composition (A) and an inner layer composed of the fluorine-containing polymer composition (B).

The tube-like formed product is then irradiated with ionizing radiation to crosslink the radiation-crosslinking composition (A) of the outer layer and graft-modify the fluorine-containing polymer composition (B) of the inner layer. Upon the irradiation, irradiation conditions are preferably controlled in such a manner that the quantity of the ionizing radiation irradiated on the fluorine-containing polymer composition (B) of the inner layer falls within a range of 20 to 700 kGy. In order to crosslink the radiation-crosslinking composition (A) of the outer layer, it is thus preferable to control the quantity of the ionizing radiation irradiated within the range of 20 to 700 kGy.

The tube-like formed product after the irradiation is then expanded in a radial direction thereof under heating, and cooled in this state to fix the form. In order to expand the tube-like formed product after the irradiation, the formed product is generally expanded to ordinarily 1.1 to 5 times, preferably 1.2 to 4 times, more preferably 1.3 to 3 times as much as the original diameter thereof. As a method for expanding the formed product, is preferably used a method of blowing compressed air into an interior cavity of the tube-like formed product. The cooling and fixation after the expansion is conducted by, for example, a method of dipping the tube-like formed product in water controlled to room temperature (25° C.) or lower.

Since the multi-layer heat-shrinkable tube has the fluorine-containing polymer layer crosslinked and expanded as the outer layer, it is shrunk to the original diameter when it is heated. When an adherend is covered with the multi-layer heat-shrinkable tube according to the present invention, and the tube is heat-shrunk, a coated product with the tube brought into close contact with the surface of the adherend can be provided. The heating conditions are within a range of preferably 100 to 250° C., more preferably 130 to 200° C., particularly preferably 140 to 180° C. The adhesive composition layer of the inner layer melt-flows under the heating conditions and adheres to the adherend. According to the multi-layer heat-shrinkable tube of the present invention, a space between the tube and the adherend can thus be completely filled. In addition, it has excellent adhesive property to the adherent, so that penetration of air, chemicals, water, moisture, etc. can be prevented.

Since the radiation-crosslinking composition forming the outer layer and containing the fluorine-containing polymer is irradiated and crosslinked, it is neither melted nor decomposed under ordinary heating conditions upon heat shrinkage. In order to prevent the outer layer from melting at the heating temperature upon the heat shrinkage, it is desirable to use a fluorine-containing polymer having a melting point of preferably at least 110° C., more preferably 110 to 200° C., particularly preferably 140 to 200° C.

On the other hand, the adhesive composition of the inner layer is graft-modified by irradiation with the ionizing radiation, but is not crosslinked, so that it has melt flowability. In order for the adhesive composition arranged as the inner layer to exhibit melt flowability under the heating conditions that the outer layer develops the heat shrinkability, it is preferable to use, as the fluorine-containing polymer making up the adhesive composition, a fluororesin whose melting point is preferably not lower than 80° C., but lower than 140° C., more preferably 90 to 130° C., or fluororubber whose Mooney viscosity ($ML_{1+10}$, 121° C.) is generally about 5 to 70, preferably about 10 to 50 from the viewpoint of balance between heat resistance and melt flowability. A blend of the fluororesin with the fluororubber may also be used to control the heat resistance and melt flowability of the adhesive composition layer.

Figure 1:
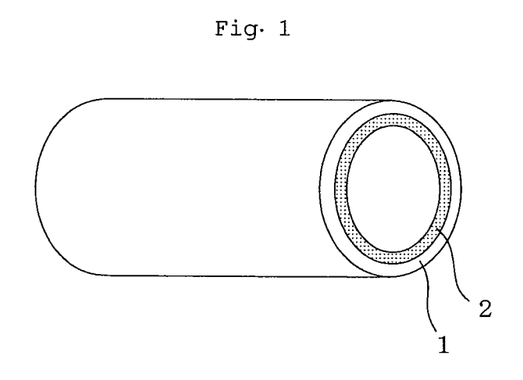
FIG. 1 schematically illustrates a layer structure of a multi-layer heat-shrinkable tube according to the present invention.

FIG. 1 schematically illustrates a layer structure of a multi-layer heat-shrinkable tube according to the present invention. The multi-layer heat-shrinkable tube according to the present invention is composed of an outer layer 1 that forms a body of the heat-shrinkable tube, and an adhesive composition layer 2 arranged on an internal surface thereof.

The heat-shrinkable cap has a structure that one opening end of a multi-layer heat-shrinkable tube having the same layer structure as described above is heat-shrunk to seal the end with the molten adhesive composition.

Figure 2:
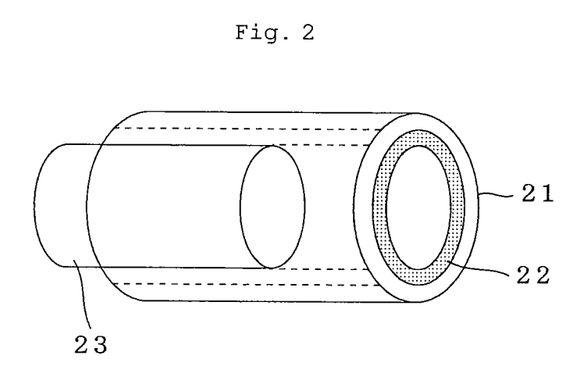
FIG. 2 schematically illustrates a production process of a heat-shrinkable cap.
Figure 3:
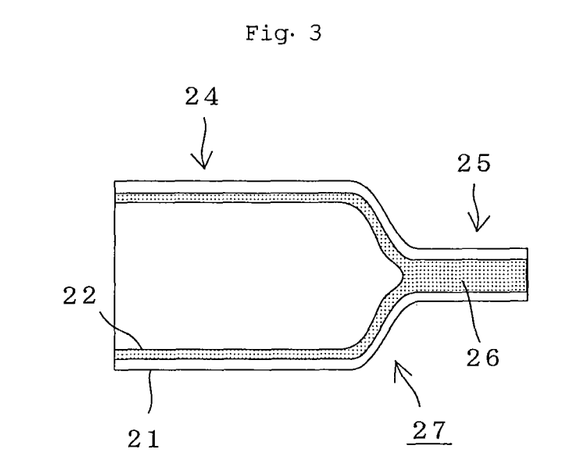
FIG. 3 is a cross-sectional vies illustrating a structure of a heat-shrinkable cap according to the present invention.

FIGS. 2 and 3 schematically illustrate a production process and a structure of the heat-shrinkable cap, respectively. The heat-shrinkable cap according to the present invention is formed from a multi-layer heat-shrinkable tube composed of an outer layer 21 that forms a body of the heat-shrinkable tube, and an adhesive composition layer 22 arranged on an internal surface thereof and having a desired length. A rod 23 is inserted from one opening of this heat-shrinkable tube up to the middle thereof, or the rod is covered with the heat-shrinkable tube. The rod is preferably that formed of a non-adhesive material, such as a polytetrafluoroethylene rod.

When the heat-shrinkable tube is heated in the state shown in FIG. 2, the tube is heat-shrunk at an opening end, in which no rod is present, and the adhesive composition that is a material of the inner layer is melted to seal the opening end. Thereafter, when the rod is pulled out, a portion 26 that the heat-shrinkable tube 21 has been heat-shrunk at one opening end portion, and the adhesive composition has been melted and filled therein is produced as illustrated in FIG. 3. This heat-shrinkable cap 27 has a portion 24 linked to the other opening end and a sealed portion 25 heat-shrunk and filled with the adhesive composition.

Figure 4:
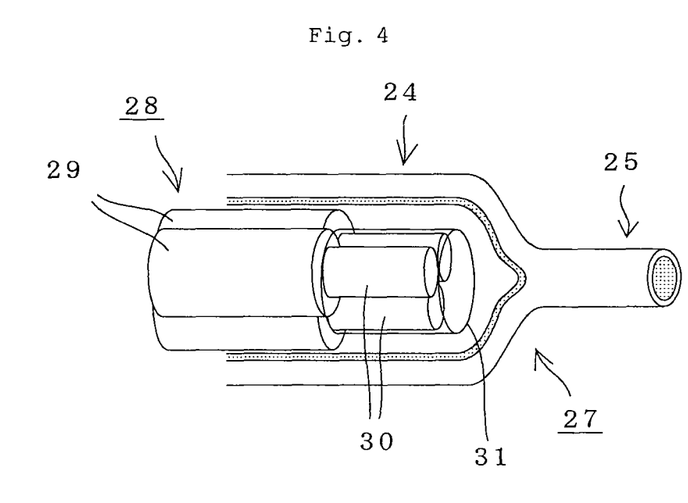
FIG. 4 schematically illustrates a step of capping an end of a covered cable with the heat-shrinkable cap.

FIG. 4 illustrates an exemplary use embodiment of this heat-shrinkable cap. At an end of a covered cable 28 containing 3 electric wires 29, exposed conductors 30 are crimped and fixed by a crimp sleeve 31 made of a metal, and covered with the heat-shrinkable cap 27. Since the heat-shrinkable cap 27 is sealed at one end, it is only necessary to insert the end portion of the covered cable 28 from the other opening end. When the heat-shrinkable cap is then heated to heat-shrink it, the cap is brought into close contact with the end portion of the covered cable.

EXAMPLES

The present invention will hereinafter be described more specifically by the following Examples, Comparative Examples and Referential Examples. Measuring methods of physical properties and characteristics or properties, which are adopted in the present invention, are as described in Example 1.

Example 1

1. Preparation of Sample for Evaluation of Adhesive Composition

In a twin-screw mixer preset at 180° C., were melted and kneaded 100 parts by weight of a ternary polyvinylidene fluoride copolymer [product of Mitsubishi Chemical Corporation, trade name "KYNAR 9300"; melting point=100° C., melt flow rate (MFR)=120 g/min (measured at a temperature of 190° C. under a load of 2.16 kg)], 3 parts by weight of glycidyl methacrylate as an epoxy group-containing unsaturated compound and 0.5 parts by weight of pentaerythritol-tetrakis[3-(3,5-di-t-butyl-4-hydroxy-phenyl)propionate] as an antioxidant. The thus-obtained kneaded product was pelletized by means of a pelletizer. The pellets were formed into a sheet having a thickness of 1 mm by means of a hot press. This hot-pressed sheet was irradiated with 60 kGy of electron rays of acceleration voltage of 2 MeV to prepare a sample for evaluation.

2. Test for Initial Adhesion Strength to Metal Plates:

Strips of 20 mm in width and 100 mm in length were punched out of the sample for evaluation. The strip and each of various metal plates (a stainless steel plate, a copper plate, an iron plate and an aluminum plate) of the same shape were heated and pressurized under pressurization conditions of 160° C. in temperature, 2 MPs in pressure and 2 minutes in pressurizing time by means of a hot press to laminate them. With respect to the thus-obtained laminated samples, the peeling strength was measured (n=3) by a T-shape peeling test (rate of pulling: 50 mm/min) to regard an average value thereof as initial adhesion strength to its corresponding metal plate, thereby evaluating the sample. In the case of a heat-shrinkable tube used in a joint of a wire harness, or the like and having a structure that a hot-melt adhesive layer has been arranged as an inner layer, it has been found that adhesion strength of at least 1.0 kg/cm is required in order to remain the waterproofness of the joint. In the above-described evaluation also, the fact that adhesion strength between the adhesive and the metal is at least 1.0 kg/cm is used as a standard of judgment for passing.

3. Evaluation of Heat Resistance:

The above-described laminated samples were subjected to accelerated deterioration under conditions of 3,000 hours in a gear oven of 150° C. With respect to the samples after the accelerated deterioration, the peeling strength (adhesive strength) was measured in the same manner as described above.

The evaluation of the heat resistance is made in consideration of the long-term heat resistance in the ISO Standard, and the sample can be ranked as having a continuous service temperature of at least 150° C. where the adhesive strength of the sample is at least 1.0 kg/cm after the accelerated deterioration at 150° C. for 3,000 hours.

4. Production of Multi-Layer Heat-Shrinkable Tube:

A radiation-crosslinking composition obtained by blending 1 part by weight of trimethylolpropane trimethacrylate with 100 parts by weight of a binary polyvinylidene fluoride copolymer [product of Mitsubishi Chemical Corporation, trade name "KYNAR 2800"; melting point=148° C., MFR=0.2 g/10 min (measured at a temperature of 230° C. under a load of 2.16 kg)] was poured into a melt-extruder for outer layer (40 mm in diameter; Hastelloy-worked full-flight type), and the pellets of the composition prepared in the item 1 and containing the ternary copolymer, glycidyl methacrylate and the antioxidant were poured into a melt-extruder for inner layer (30 mm in diameter; Hastelloy-worked full-flight type) to melt-extrude them from a cross head for two-layer extrusion at an extrusion temperature of 180° C., thereby forming a tube of a 2-layer structure having an inner diameter of 2.5 mm, an outer diameter of 6.5 mm and an inner layer thickness of 1 mm. This tube was irradiated with 60 kGy of electron rays of acceleration voltage of 2 MeV to crosslink the outer layer and graft-modify the inner layer.

The crosslinked tube was left to stand for 3 minutes in a thermostatic chamber preset to 170° C. to preheat it, and then expanded by a method of blowing compressed air into an interior cavity of the tube until the inner diameter reached 7.0 mm. Thereafter, the tube was immediately taken out of the thermostatic chamber and cooled and solidified with water to fix the form. The multi-layer heat-shrinkable tube obtained in such a manner was cut into lengths of 60 mm.

5. Evaluation of Waterproofness:

Seven fluororesin-coated cables (ARX-3KAI) manufactured by Sumitomo Electric Industries, Ltd. and each having an outer diameter of 1.25 mm (conductor=12/0.18, thickness=0.25 mm) were joined to 4 fluororesin-coated cables (ARX-3KAI) manufactured by Sumitomo Electric Industries, Ltd. and each having an outer diameter of 1.48 mm (conductor=11/0.16, thickness=0.43 mm), and the joint was covered with the multi-layer heat-shrinkable tube having the length of 60 mm. The multi-layer heat-shrinkable tube was shrunk at 520° C. for 20 seconds by means of a batch type shrink-processing machine manufactured by Sumitomo Electric Industries, Ltd. to obtain a joint sample.

The multi-layer heat-shrinkable tube covered on the joint was put into water to the depth of 30 mm (a twisted cable composed of 7 copper wires on the water, and a twisted cable composed of 4 iron wires in the water), and pressurized air of 49 kPa was sent for 30 seconds from an upper part of the tube to check whether air leakage occurred or not. When no air leakage occurred, such a tube was judged to have high waterproof performance and ranked as "acceptance". When air leakage occurred, such a tube was judged to be insufficient in waterproofness and ranked as "rejection" (evaluation of initial waterproofness).

After the joint was deteriorated under conditions of 150° C. in temperature (hot-air atmosphere) and 3,000 hours, the waterproofness was evaluated in the same manner as described above (evaluation of waterproofness after deterioration).

6. Result of Evaluation:

As the result of the evaluation, it was found that the adhesive composition described above has initial adhesion strength of at least 1.0 kg/cm, and even in the evaluation of the initial waterproofness using the multi-layer heat-shrinkable tube having the adhesive composition as the inner layer, acceptance is gained in all cases. It was also found that the adhesive composition exhibits excellent heat resistance as demonstrated by the fact that the adhesion strength after the deterioration at 150° C. for 3,000 hours is at least 1.0 kg/cm, and acceptance is gained even in the evaluation of waterproofness after the deterioration. The results are shown in Table 1.

Examples 2 to 12

Samples for evaluation of adhesive composition and multi-layer heat-shrinkable tubes were produced in the same manner as in Example 1 except that the kind of the fluorine-containing polymer used in the adhesive composition, the kind and blending proportion of the polar group-containing unsaturated compound, and the quantity of the accelerated electron rays irradiated were changed so as to be shown in Table 1, and evaluation was made in the same manner as in Example 1. In each of the adhesive compositions, 0.5 parts by weight of pentaerythritol-tetrakis[3-(3,5-di-t-butyl-4-hydroxyphenyl)propionate] as an antioxidant were incorporated into 100 parts by weight of the fluorine-containing polymer though not shown in Table 1.

As the result of the evaluation, it was found that the adhesive compositions according to Examples 2 to 12 each have initial adhesion strength of at least 1.0 kg/cm, and even in the evaluation of the initial waterproofness using the multi-layer heat-shrinkable tube having the adhesive composition as the inner layer, acceptance is gained in all cases. It was also found that the multi-layer heat-shrinkable tube exhibits excellent heat resistance as demonstrated by the fact that the adhesion strength after the deterioration at 150° C. for 3,000 hours is at least 1.0 kg/cm, and acceptance is gained even in the evaluation of waterproofness after the deterioration. The results are shown in Table 1.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| PVdF-1 (*1) | | 100 | — | — | — | 100 | — | — | — | 100 | — | — | — |
| PVdF-2 (*2) | | — | 100 | — | — | — | 100 | — | — | — | 100 | — | — |
| FKM-1 (*3) | | — | — | 100 | — | — | — | 100 | — | — | — | 100 | — |
| FKM-2 (*4) | | — | — | — | 100 | — | — | — | 100 | — | — | — | 100 |
| Glycidyl methacrylate | | 3 | 25 | 15 | 5 | — | — | — | — | — | — | — | — |
| Diallylmonoglycidyl isocyanate | | — | — | — | — | 3 | 10 | 5 | 25 | — | — | — | — |
| Maleic anhydride | | — | — | — | — | — | — | — | — | 20 | 5 | 10 | 3 |
| Quantity of electron rays | kGy | 60 | 20 | 200 | 400 | 650 | 300 | 250 | 20 | 100 | 500 | 300 | 600 |
| Initial adhesion strength, kg/cm | Stainless | 1.7 | 1.9 | 1.8 | 1.9 | 1.6 | 2.1 | 2.0 | 1.8 | 1.9 | 1.7 | 1.8 | 1.8 |
| | Copper | 1.7 | 1.7 | 1.8 | 1.7 | 1.5 | 1.7 | 1.9 | 1.8 | 1.6 | 1.7 | 1.6 | 1.7 |
| | Iron | 1.8 | 1.9 | 1.6 | 2 | 1.9 | 1.8 | 1.8 | 1.7 | 1.6 | 1.5 | 1.7 | 1.7 |
| | Aluminum | 1.9 | 1.9 | 1.8 | 1.6 | 1.6 | 1.8 | 1.8 | 1.6 | 1.8 | 1.6 | 1.7 | 1.8 |
| Evaluation of initial waterproofness by heat-shrinkable tube | | Acpt. | Acpt. | Acpt. | Acpt. | Acpt. | Acpt. | Acpt. | Acpt. | Acpt. | Acpt. | Acpt. | Acpt. |
| Adhesion strength after 150° C. × 3000 hrs, kg/cm | Stainless | 1.2 | 1.6 | 1.4 | 1.5 | 1.1 | 1.8 | 1.6 | 1.4 | 1.4 | 1.3 | 1.5 | 1.2 |
| | Copper | 1.2 | 1.3 | 1.4 | 1.5 | 1.1 | 1.4 | 1.3 | 1.4 | 1.3 | 1.2 | 1.3 | 1.3 |
| | Iron | 1.4 | 1.6 | 1.4 | 1.6 | 1.4 | 1.6 | 1.4 | 1.4 | 1.3 | 1.2 | 1.4 | 1.2 |
| | Aluminum | 1.3 | 1.5 | 1.4 | 1.3 | 1.0 | 1.5 | 1.4 | 1.2 | 1.5 | 1.3 | 1.4 | 1.3 |
| Evaluation of waterproofness after deterioration | | Acpt. | Acpt. | Acpt. | Acpt. | Acpt. | Acpt. | Acpt. | Acpt. | Acpt. | Acpt. | Acpt. | Acpt. |

(Note)
(*1) PVdF-1: Ternary polyvinylidene fluoride copolymer [product of Mitsubishi Chemical Corporation, trade name "KYNAR 9300"; melting point = 100° C., MFR = 120 g/min (measured at a temperature of 190° C. under a load of 2.16 kg)],
(*2) PVdF-2: Binary polyvinylidene fluoride copolymer [product of Mitsubishi Chemical Corporation, trade name "KYNAR 7200"; melting point = 120° C., MFR = 2 g/min (measured at a temperature of 230° C. under a load of 2.16 kg)],
(*3) FKM-1: Binary fluororubber [product of Du Pont, trade name "Viton E-430"; fluorine content = 66%, Mooney viscosity $(ML_{1+10}, 121° C.) = 20$],
(*4) FKM-2: Ternary fluororubber [product of Du Pont, trade name "Viton B-50"; fluorine content = 68%, Mooney viscosity $(ML_{1+10}, 121° C.) = 30$].

Examples 13 to 24

Samples for evaluation of adhesive composition and multi-layer heat-shrinkable tubes were produced in the same manner as in Example 1 except that a blend of a fluororesin and a fluororubber was used as the fluorine-containing polymer used in the adhesive composition as shown in Table 2, and the kind and blending proportion of the polar group-containing unsaturated compound, and the quantity of the accelerated electron rays irradiated were changed so as to be shown in Table 2, and evaluation was made in the same manner as in Example 1. In each of the adhesive compositions, 0.5 parts by weight of pentaerythritol-tetrakis[3-(3,5-di-t-butyl-4-hydroxyphenyl)propionate] as an antioxidant were incorporated into 100 parts by weight of the fluorine-containing polymer though not shown in Table 2.

As the result of the evaluation, it was found that the adhesive compositions according to Examples 13 to 24 each have initial adhesion strength of at least 1.0 kg/cm, and even in the evaluation of the initial waterproofness using the multi-layer heat-shrinkable tube having the adhesive composition as the inner layer, acceptance is gained in all cases. It was also found that the multi-layer heat-shrinkable tubes exhibit excellent heat resistance as demonstrated by the fact that the adhesion strength after the deterioration at 150° C. for 3,000 hours is at least 1.0 kg/cm, and acceptance is gained even in the evaluation of waterproofness after the deterioration. The results are shown in Table 2.

TABLE 2

|  |  | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|---|
| PVdF-1 (*1) | | 50 | 80 | — | — | 70 | 40 | 70 | 40 | — | — | — | — |
| PVdF-2 (*2) | | — | — | 80 | 50 | — | — | — | — | 80 | 50 | 40 | 70 |
| FKM-1 (*3) | | 50 | — | 20 | — | 30 | — | 30 | — | 20 | — | 60 | — |
| FKM-2 (*4) | | — | 20 | — | 50 | — | 60 | — | 60 | — | 50 | — | 30 |
| Glycidyl methacrylate | | 25 | 2.5 | 15 | 20 | — | — | — | — | — | — | — | — |
| Diallylmonoglycidyl isocyanate | | — | — | — | — | 10 | 2 | — | — | — | — | 15 | 10 |
| Maleic anhydride | | — | — | — | — | — | — | 15 | 3 | 25 | 5 | — | — |
| Quantity of electron rays | kGy | 25 | 650 | 300 | 200 | 300 | 700 | 250 | 600 | 20 | 400 | 200 | 300 |
| Initial adhesion strength, kg/cm | Stainless | 1.8 | 1.6 | 2.2 | 2.1 | 2.3 | 1.7 | 1.8 | 1.7 | 1.8 | 1.7 | 2.2 | 1.6 |
| | Copper | 1.8 | 1.7 | 1.8 | 2.1 | 1.9 | 1.8 | 1.8 | 1.8 | 1.7 | 1.7 | 2.0 | 1.5 |
| | Iron | 1.6 | 1.6 | 2.0 | 2.3 | 2.1 | 1.6 | 1.6 | 1.6 | 1.8 | 1.8 | 2.0 | 1.5 |
| | Aluminum | 1.8 | 1.8 | 1.9 | 2.2 | 2.2 | 1.6 | 1.6 | 1.6 | 1.6 | 1.6 | 2.1 | 1.4 |
| Evaluation of initial waterproofness by heat-shrinkable tube | | Acpt. | Acpt. | Acpt. | Acpt. | Acpt. | Acpt. | Acpt. | Acpt. | Acpt. | Acpt. | Acpt. | Acpt. |
| Adhesion strength after 150° C. × 3000 | Stainless | 1.4 | 1.1 | 1.8 | 1.8 | 1.9 | 1.3 | 1.4 | 1.2 | 1.5 | 1.2 | 1.9 | 1.3 |
| | Copper | 1.4 | 1.1 | 1.5 | 1.7 | 1.4 | 1.3 | 1.4 | 1.4 | 1.3 | 1.2 | 1.6 | 1.1 |

TABLE 2-continued

|  |  | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|---|
| hrs, kg/cm | Iron | 1.4 | 1.1 | 1.5 | 1.7 | 1.7 | 1.2 | 1.3 | 1.3 | 1.4 | 1.2 | 1.6 | 1.1 |
|  | Aluminum | 1.4 | 1.4 | 1.4 | 1.9 | 1.6 | 1.2 | 1.3 | 1.3 | 1.3 | 1.1 | 1.7 | 1.0 |
| Evaluation of waterproofness after deterioration |  | Acpt. | Acpt. | Acpt. | Acpt. | Acpt. | Acpt. | Acpt. | Acpt. | Acpt. | Acpt. | Acpt. | Acpt. |

(Note)
(*1) PVdF-1: Product of Mitsubishi Chemical Corporation, trade name "KYNAR 9300" [melting point = 100° C., MFR = 120 g/min (measured at a temperature of 190° C. under a load of 2.16 kg)],
(*2) PVdF-2: Product of Mitsubishi Chemical Corporation, trade name "KYNAR 7200" [melting point = 120° C., MFR = 2 g/min (measured at a temperature of 230° C. under a load of 2.16 kg)],
(*3) FKM-1: Product of Du Pont, trade name "Viton E-430" [fluorine content = 66%, Mooney viscosity ($ML_{1+10}$, 121° C.) = 20],
(*4) FKM-2: Product of Du Pont, trade name "Viton B-50" [fluorine content = 68%, Mooney viscosity ($ML_{1+10}$, 121° C.) = 30].

Comparative Examples 1 to 12

Samples for evaluation of adhesive composition and multi-layer heat-shrinkable tubes were produced in the same manner as in Example 1 except that the kind of the fluorine-containing polymer used in the adhesive composition, and the kind and blending proportion of the polar group-containing unsaturated compound were changed so as to be shown in Table 3, and the accelerated electron rays were not irradiated, and evaluation was made in the same manner as in Example 1. In each of the adhesive compositions, 0.5 parts by weight of pentaerythritol-tetrakis[3-(3,5-di-t-butyl-4-hydroxyphenyl) propionate] as an antioxidant were incorporated into 100 parts by weight of the fluorine-containing polymer though not shown in Table 1.

As the result, the compositions according to Comparative Examples 1 to 12 each had initial adhesion strength lower than 1.0 kg/cm, and the function as an adhesive was insufficient. Thus, the evaluation of the adhesion strength after the deterioration at 150° C. for 3,000 hours was not conducted.

It was found that in the evaluation of the initial waterproofness using the multi-layer heat-shrinkable tube having, as the inner layer, each of the compositions according to Comparative Examples 1 to 12, rejection is given in all cases. It was found that all these multi-layer heat-shrinkable tubes are also rejected in the evaluation of waterproofness after the deterioration at 150° C. for 3,000 hours. The results are shown in Table 3.

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|---|
| PVdF-1 (*1) |  | 100 | — | — | — | 100 | — | — | — | 100 | — | — | — |
| PVdF-2 (*2) |  | — | 100 | — | — | — | 100 | — | — | — | 100 | — | — |
| FKM-1 (*3) |  | — | — | 100 | — | — | — | 100 | — | — | — | 100 | — |
| FKM-2 (*4) |  | — | — | — | 100 | — | — | — | 100 | — | — | — | 100 |
| Glycidyl methacrylate |  | 2 | 30 | 15 | 5 | — | — | — | — | — | — | — | — |
| Diallylmonoglycidyl isocyanate |  | — | — | — | — | 3 | 10 | 5 | 25 | — | — | — | — |
| Maleic anhydride |  | — | — | — | — | — | — | — | — | 20 | 5 | 10 | 2.5 |
| Quantity of electron rays | kGy | 0 | 0 | 0 | 0 | 0 | 0 | 0 | 0 | 0 | 0 | 0 | 0 |
| Initial adhesion strength, kg/cm | Stainless | 0.2 | 0.3 | 0.2 | 0.1 | 0.0 | 0.2 | 0.1 | 0.2 | 0.2 | 0.0 | 0.1 | 0.0 |
|  | Copper | 0.2 | 0.1 | 0.1 | 0.1 | 0.0 | 0.1 | 0.2 | 0.1 | 0.0 | 0.1 | 0.1 | 0.0 |
|  | Iron | 0.1 | 0.1 | 0.1 | 0.1 | 0.1 | 0.2 | 0.1 | 0.2 | 0.2 | 0.0 | 0.1 | 0.0 |
|  | Aluminum | 0.2 | 0.1 | 0.1 | 0.0 | 0.0 | 0.1 | 0.2 | 0.2 | 0.2 | 0.0 | 0.1 | 0.0 |
| Evaluation of initial waterproofness by heat-shrinkable tube |  | Reject | Reject | Reject | Reject | Reject | Reject | Reject | Reject | Reject | Reject | Reject | Reject |
| Adhesion strength after 150° C. × 3000 hrs, kg/cm | Stainless | — | — | — | — | — | — | — | — | — | — | — | — |
|  | Copper | — | — | — | — | — | — | — | — | — | — | — | — |
|  | Iron | — | — | — | — | — | — | — | — | — | — | — | — |
|  | Aluminum | — | — | — | — | — | — | — | — | — | — | — | — |
| Evaluation of waterproofness after deterioration |  | Reject | Reject | Reject | Reject | Reject | Reject | Reject | Reject | Reject | Reject | Reject | Reject |

(Note)
(*1) PVdF-1: Product of Mitsubishi Chemical Corporation, trade name "KYNAR 9300" [melting point = 100° C., MFR = 120 g/min (measured at a temperature of 190° C. under a load of 2.16 kg)],
(*2) PVdF-2: Product of Mitsubishi Chemical Corporation, trade name "KYNAR 7200" [melting point = 120° C., MFR = 2 g/min (measured at a temperature of 230° C. under a load of 2.16 kg)],
(*3) FKM-1: Product of Du Pont, trade name "Viton E-430" [fluorine content = 66%, Mooney viscosity ($ML_{1+10}$, 121° C.) = 20],
(*4) FKM-2: Product of Du Pont, trade name "Viton B-50" [fluorine content = 68%, Mooney viscosity ($ML_{1+10}$, 121° C.) = 30].

Comparative Examples 13 to 16 and Referential Example 1

Samples for evaluation of adhesive composition and multi-layer heat-shrinkable tubes were produced in the same manner as in Example 1 except that the kind of the fluorine-containing polymer used in the adhesive composition, and the quantity of the accelerated electron rays irradiated were changed so as to be shown in Table 4, and the polar group-containing unsaturated compound was not used, and evaluation was made in the same manner as in Example 1. In each of the adhesive compositions according to Comparative Examples 13 to 16, 0.5 parts by weight of pentaerythritol-tetrakis[3-(3,5-di-t-butyl-4-hydroxyphenyl)propionate] as an antioxidant were incorporated into 100 parts by weight of the fluorine-containing polymer though not shown in Table 4.

For the sake of reference, a sample for evaluation of adhesive composition and a multi-layer heat-shrinkable tube were produced in the same manner as in Example 1 except that a hot-melt adhesive comprising a dimer acid type polyamide resin as a principal component was used in place of the adhesive composition making use of the fluorine-containing polymer, and the quantity of the electron rays irradiated was changed to 200 kGy, and evaluation was made in the same manner as in Example 1.

As the result, the compositions according to Comparative Examples 13 to 16 each had initial adhesion strength lower than 1.0 kg/cm, and the function as an adhesive was insufficient. With respect to these compositions, thus, the evaluation of the adhesion strength after the deterioration at 150° C. for 3,000 hours was not conducted.

It was found that in the evaluation of the initial waterproofness using the multi-layer heat-shrinkable tube having, as the inner layer, each of the compositions according to Comparative Examples 13 to 16, rejection is given in all cases. It was found that all these multi-layer heat-shrinkable tubes are also rejected in the evaluation of waterproofness after the deterioration at 1500 for 3,000 hours.

On the other hand, Referential Example 1 relates to a hot-melt adhesive comprising a dimer acid type polyamide resin as a principal component, and it was found that its initial adhesion strength to the metals is as excellent as at least 1.0 kg/cm, and even in the evaluation of the initial waterproofness using the multi-layer heat-shrinkable tube having the hot-melt adhesive as the inner layer, acceptance is gained. However, when the adhesive was aged at 150° C. for 3,000 hours in a gear oven, the hot-melt adhesive was markedly deteriorated, so that it scarcely exhibited adhesive property, and the adhesion strength thereof was evaluated as 0 kg/cm. It was also found that this heat-shrinkable tube is given rejection in the evaluation of waterproofness after the deterioration

TABLE 4

| | | Comp. Ex. 13 | Comp. Ex. 14 | Comp. Ex. 15 | Comp. Ex. 16 | Referential Ex. 1 |
|---|---|---|---|---|---|---|
| PVdF-1 (*1) | | 100 | — | — | — | Hot-melt adhesive comprising dimer acid type polyamide resin as main component |
| PVdF-2 (*2) | | — | 100 | — | — | — |
| FKM-1 (*3) | | — | — | 100 | — | — |
| FKM-2 (*4) | | — | — | — | 100 | — |
| Glycidyl methacrylate | | — | — | — | — | — |
| Diallylmonoglycidyl isocyanate | | — | — | — | — | — |
| Maleic anhydride | | — | — | — | — | — |
| Quantity of electron rays | kGy | 700 | 200 | 400 | 20 | 200 |
| Initial adhesion strength, kg/cm | Stainless | 0.0 | 0.0 | 0.0 | 0.0 | 1.4 |
| | Copper | 0.0 | 0.0 | 0.0 | 0.0 | 2.3 |
| | Iron | 0.0 | 0.0 | 0.0 | 0.0 | 1.7 |
| | Aluminum | 0.0 | 0.0 | 0.0 | 0.0 | 1.5 |
| Evaluation of initial waterproofness by heat-shrinkable tube | | Reject | Reject | Reject | Reject | Acceptance |
| Adhesion strength after 150° C. × 3000 hrs, kg/cm | Stainless | — | — | — | — | 0.0 |
| | Copper | — | — | — | — | 0.0 |
| | Iron | — | — | — | — | 0.0 |
| | Aluminum | — | — | — | — | 0.0 |
| Evaluation of waterproofness after deterioration | | Reject | Reject | Reject | Reject | Reject |

(Note)
(*1) PVdF-1: Product of Mitsubishi Chemical Corporation, trade name "KYNAR 9300" [melting point = 100° C., MFR = 120 g/min (measured at a temperature of 190° C. under a load of 2.16 kg)],
(*2) PVdF-2: Product of Mitsubishi Chemical Corporation, trade name "KYNAR 7200" [melting point = 120° C., MFR = 2 g/min (measured at a temperature of 230° C. under a load of 2.16 kg)],
(*3) FKM-1: Product of Du Pont, trade name "Viton E-430" [fluorine content = 66%, Mooney viscosity $(ML_{1+10}, 121° C.) = 20]$,
(*4) FKM-2: Product of Du Pont, trade name "Viton B-50" [fluorine content = 68%, Mooney viscosity $(ML_{1+10}, 121° C.) = 30]$.

Comparative Examples 17 to 32

Samples for evaluation of adhesive composition and multi-layer heat-shrinkable tubes were produced in the same manner as in Example 1 except that a blend of a fluororesin and a fluororubber was used as the fluorine-containing polymer used in the adhesive composition as shown in Table 5, and the kind and blending proportion of the polar group-containing unsaturated compound, and the quantity of the accelerated electron rays irradiated were changed so as to be shown in Table 5, and evaluation was made in the same manner as in Example 1. In each of the adhesive compositions, 0.5 parts by weight of pentaerythritol-tetrakis[3-(3,5-di-t-butyl-4-hydroxyphenyl)propionate] as an antioxidant were incorporated into 100 parts by weight of the fluorine-containing polymer though not shown in Table 5.

As the result of the evaluation, it was found that when no electron ray was irradiated (Comparative Examples 17 to 28) even when the polar group-containing unsaturated compound was used, or when no polar group-containing unsaturated compound was used (Comparative Examples 29 to 32) even when the electron rays were irradiated, all the adhesive compositions had initial adhesion strength lower than 1.0 kg/cm, and could not sufficiently fulfill a function as an adhesive. With respect to these compositions, thus, the evaluation of the adhesion strength after the deterioration at 150° C. for 3,000 hours was not conducted.

The test for the waterproofness using the multi-layer heat-shrinkable tube having, as the inner layer, each of the compositions according to Comparative Examples 17 to 32 revealed that rejection is given in all cases of the evaluation as to the initial waterproofness. It was found that all these multi-layer heat-shrinkable tubes are also rejected in the evaluation of waterproofness after the deterioration at 150° C. for 3,000 hours. The results are shown in Table 5.

Comparative Examples 33 to 44

Samples for evaluation of adhesive composition and multi-layer heat-shrinkable tubes were produced in the same manner as in Example 1 except that the kind of the fluorine-containing polymer used in the adhesive composition, and the quantity of the accelerated electron rays irradiated were changed so as to be shown in Table 6, and the proportion of the polar group-containing unsaturated compound blended was changed to lower than 2 parts by weight (Comparative Examples 33 to 38), or higher than 30 parts by weight (Comparative Examples 39 to 44), and evaluation was made in the same manner as in Example 1. In each of the adhesive compositions prepared above, 0.5 parts by weight of pentaerythritol-tetrakis[3-(3,5-di-t-butyl-4-hydroxyphenyl)propionate] as an antioxidant were incorporated into 100 parts by weight of the fluorine-containing polymer though not shown in Table 6.

As the result, the adhesive compositions according to Comparative Examples 33 to 44 each had initial adhesion strength lower than 1.0 kg/cm, and could not sufficiently fulfill a function as an adhesive. With respect to these compositions, thus, the evaluation of the adhesion strength after the deterioration at 150° C. for 3,000 hours was not conducted.

The test for the waterproofness using the multi-layer heat-shrinkable tube having, as the inner layer, each of the compositions according to Comparative Examples 33 to 44 revealed that rejection is given in all cases of the evaluation as to the initial waterproofness. It was found that all these multi-layer heat-shrinkable tubes are also rejected in the evaluation of waterproofness after the deterioration at 150° C. for 3,000 hours. The results are shown in Table 6.

TABLE 5

| | | Comparative Example | | | | | | | | | | | | | | | |
|---|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 | 32 |
| PVdF-1 (*1) | | 50 | 80 | — | — | 70 | 40 | 70 | 40 | — | — | — | — | 50 | 80 | — | — |
| PVdF-2 (*2) | | — | — | 80 | 50 | — | — | — | — | 80 | 50 | 40 | 70 | — | — | 80 | 50 |
| FKM-1 (*3) | | 50 | — | 20 | — | 30 | — | 30 | — | 20 | — | 60 | — | 50 | — | 20 | — |
| FKM-2 (*4) | | — | 20 | — | 50 | — | 60 | — | 60 | — | 50 | — | 30 | — | 20 | — | 50 |
| Glycidyl methacrylate | | 30 | 2 | 10 | 25 | — | — | — | — | — | — | — | — | — | — | — | — |
| Diallylmonoglycidyl isocyanate | | — | — | — | — | 10 | 5 | — | — | — | — | 15 | 3 | — | — | — | — |
| Maleic anhydride | | — | — | — | — | — | — | 15 | 5 | 10 | 2.5 | — | — | — | — | — | — |
| Quantity of electron rays | kGy | 0 | 0 | 0 | 0 | 0 | 0 | 0 | 0 | 0 | 0 | 0 | 0 | 30 | 650 | 300 | 150 |
| Initial adhesion strength, kg/cm | Stainless | 0.3 | 0.1 | 0.2 | 0.2 | 0.1 | 0.1 | 0.2 | 0.1 | 0.2 | 0.1 | 0.2 | 0.1 | 0.0 | 0.0 | 0.0 | 0.0 |
| | Copper | 0.2 | 0.1 | 0.1 | 0.1 | 0.0 | 0.1 | 0.2 | 0.0 | 0.0 | 0.1 | 0.1 | 0.1 | 0.0 | 0.0 | 0.0 | 0.0 |
| | Iron | 0.2 | 0.2 | 0.1 | 0.1 | 0.1 | 0.1 | 0.1 | 0.2 | 0.2 | 0.1 | 0.1 | 0.1 | 0.0 | 0.0 | 0.0 | 0.0 |
| | Aluminum | 0.2 | 0.1 | 0.1 | 0.2 | 0.1 | 0.0 | 0.1 | 0.2 | 0.1 | 0.1 | 0.1 | 0.1 | 0.0 | 0.0 | 0.0 | 0.0 |
| Evaluation of initial waterproofness by heat-shrinkable tube | | Rejt | Rejt | Rejt | Rejt | Rejt | Rejt | Rejt | Rejt | Rejt | Rejt | Rejt | Rejt | Rejt | Rejt | Rejt | Rejt |
| Adhesion strength after 150° C. × 3000 hrs, kg/cm | Stainless | — | — | — | — | — | — | — | — | — | — | — | — | — | — | — | — |
| | Copper | — | — | — | — | — | — | — | — | — | — | — | — | — | — | — | — |
| | Iron | — | — | — | — | — | — | — | — | — | — | — | — | — | — | — | — |
| | Aluminum | — | — | — | — | — | — | — | — | — | — | — | — | — | — | — | — |
| Evaluation of waterproofness after deterioration | | Rejt | Rejt | Rejt | Rejt | Rejt | Rejt | Rejt | Rejt | Rejt | Rejt | Rejt | Rejt | Rejt | Rejt | Rejt | Rejt |

(Note)
(*1) PVdF-1: Product of Mitsubishi Chemical Corporation, trade name "KYNAR 9300" [melting point = 100° C., MFR = 120 g/min (measured at a temperature of 190° C. under a load of 2.16 kg)],
(*2) PVdF-2: Product of Mitsubishi Chemical Corporation, trade name "KYNAR 7200" [melting point = 120° C., MFR = 2 g/min (measured at a temperature of 230° C. under a load of 2.16 kg)],
(*3) FKM-1: Product of Du Pont, trade name "Viton E-430" [fluorine content = 66%, Mooney viscosity ($ML_{1+10}$, 121° C.) = 20],
(*4) FKM-2: Product of Du Pont, trade name "Viton B-50" [fluorine content = 68%, Mooney viscosity ($ML_{1+10}$, 121° C.) = 30].

TABLE 6

|  |  | Comp. Ex. 33 | Comp. Ex. 34 | Comp. Ex. 35 | Comp. Ex. 36 | Comp. Ex. 37 | Comp. Ex. 38 | Comp. Ex. 39 | Comp. Ex. 40 | Comp. Ex. 41 | Comp. Ex. 42 | Comp. Ex. 43 | Comp. Ex. 44 |
|---|---|---|---|---|---|---|---|---|---|---|---|---|---|
| PVdF-1 (*1) | | 100 | — | 100 | — | 100 | — | 100 | — | 100 | — | 100 | — |
| FKM-1 (*2) | | — | 100 | — | 100 | — | 100 | — | 100 | — | 100 | — | 100 |
| Glycidyl methacrylate | | 1.5 | 1 | — | — | — | — | 35 | 31 | — | — | — | — |
| Diallylmonoglycidyl isocyanate | | — | — | 1 | 1.5 | — | — | — | — | 40 | 35 | — | — |
| Maleic anhydride | | — | — | — | — | 1.5 | 0.5 | — | — | — | — | 50 | 32 |
| Quantity of electron rays | kGy | 100 | 550 | 650 | 500 | 300 | 700 | 50 | 200 | 150 | 300 | 20 | 350 |
| Initial adhesion strength, kg/cm | Stainless | 0.7 | 0.4 | 0.3 | 0.7 | 0.8 | 0.3 | 0.7 | 0.8 | 0.5 | 0.9 | 0.4 | 0.7 |
| | Copper | 0.6 | 0.5 | 0.3 | 0.6 | 0.7 | 0.4 | 0.6 | 0.8 | 0.6 | 0.7 | 0.5 | 0.6 |
| | Iron | 0.8 | 0.5 | 0.3 | 0.7 | 0.7 | 0.5 | 0.7 | 0.8 | 0.6 | 0.7 | 0.6 | 0.5 |
| | Aluminum | 0.6 | 0.4 | 0.4 | 0.5 | 0.6 | 0.5 | 0.8 | 0.7 | 0.5 | 0.6 | 0.6 | 0.7 |
| Evaluation of initial waterproofness by heat-shrinkable tube | | Reject | Reject | Reject | Reject | Reject | Reject | Reject | Reject | Reject | Reject | Reject | Reject |
| Adhesion strength after 150° C. × 3000 hrs, kg/cm | Stainless | — | — | — | — | — | — | — | — | — | — | — | — |
| | Copper | — | — | — | — | — | — | — | — | — | — | — | — |
| | Iron | — | — | — | — | — | — | — | — | — | — | — | — |
| | Aluminum | — | — | — | — | — | — | — | — | — | — | — | — |
| Evaluation of waterproofness after deterioration | | Reject | Reject | Reject | Reject | Reject | Reject | Reject | Reject | Reject | Reject | Reject | Reject |

(Note)
(*1) PVdF-1: Product of Mitsubishi Chemical Corporation, trade name "KYNAR 9300" [melting point = 100° C., MFR = 120 g/min (measured at a temperature of 190° C. under a load of 2.16 kg)],
(*2) FKM-1: Product of Du Pont, trade name "Viton E-430" [fluorine content = 66%, Mooney viscosity ($ML_{1+10}$, 121° C.) = 20].

Comparative Examples 45 to 56

Samples for evaluation of adhesive composition and multi-layer heat-shrinkable tubes were produced in the same manner as in Example 1 except that the combination of the fluorine-containing polymer blend used in the adhesive composition, and the quantity of the accelerated electron rays irradiated were changed so as to be shown in Table 7, and the proportion of the polar group-containing unsaturated compound blended was changed to lower than 2 parts by weight (Comparative Examples 45 to 50), or higher than 30 parts by weight (Comparative Examples 51 to 56), and evaluation was made in the same manner as in Example 1. In each of the adhesive compositions prepared above, 0.5 parts by weight of pentaerythritol-tetrakis[3-(3,5-di-t-butyl-4-hydroxyphenyl) propionate] as an antioxidant were incorporated into 100 parts by weight of the fluorine-containing polymer though not shown in Table 7.

As the result, the adhesive compositions according to Comparative Examples 45 to 56 each had initial adhesion strength lower than 1.0 kg/cm, and could not sufficiently fulfill a function as an adhesive. With respect to these compositions, thus, the evaluation of the adhesion strength after the deterioration at 150° C. for 3,000 hours was not conducted.

The test for the waterproofness using the multi-layer heat-shrinkable tube having, as the inner layer, each of the compositions according to Comparative Examples 45 to 56 revealed that rejection is given in all cases of the evaluation as to the initial waterproofness. It was found that all these multi-layer heat-shrinkable tubes are also rejected in the evaluation of waterproofness after the deterioration at 150° C. for 3,000 hours. The results are shown in Table 7.

TABLE 7

|  |  | Comp. Ex. 45 | Comp. Ex. 46 | Comp. Ex. 47 | Comp. Ex. 48 | Comp. Ex. 49 | Comp. Ex. 50 | Comp. Ex. 51 | Comp. Ex. 52 | Comp. Ex. 53 | Comp. Ex. 54 | Comp. Ex. 55 | Comp. Ex. 56 |
|---|---|---|---|---|---|---|---|---|---|---|---|---|---|
| PVdF-2 (*1) | | 30 | 80 | 40 | 50 | 20 | 60 | 60 | 20 | 50 | 40 | 80 | 30 |
| FKM-2 (*2) | | 70 | 20 | 60 | 50 | 80 | 40 | 40 | 80 | 50 | 60 | 20 | 70 |
| Glycidyl methacrylate | | 1.5 | 1 | — | — | — | — | 35 | 31 | — | — | — | — |
| Diallylmonoglycidyl isocyanate | | — | — | 1 | 1.5 | — | — | — | — | 40 | 35 | — | — |
| Maleic anhydride | | — | — | — | — | 1.7 | 0.5 | — | — | — | — | 50 | 32 |
| Quantity of electron rays | kGy | 200 | 350 | 500 | 150 | 150 | 700 | 150 | 400 | 200 | 150 | 25 | 300 |
| Initial adhesion strength, kg/cm | Stainless | 0.8 | 0.6 | 0.5 | 0.7 | 0.8 | 0.4 | 0.6 | 0.7 | 0.6 | 0.8 | 0.6 | 0.7 |
| | Copper | 0.8 | 0.6 | 0.4 | 0.8 | 0.6 | 0.2 | 0.6 | 0.6 | 0.6 | 0.8 | 0.5 | 0.7 |
| | Iron | 0.7 | 0.6 | 0.5 | 0.6 | 0.5 | 0.3 | 0.7 | 0.6 | 0.5 | 0.8 | 0.5 | 0.5 |
| | Aluminum | 0.7 | 0.7 | 0.3 | 0.8 | 0.6 | 0.4 | 0.6 | 0.7 | 0.5 | 0.7 | 0.4 | 0.4 |
| Evaluation of initial waterproofness by heat-shrinkable tube | | Reject | Reject | Reject | Reject | Reject | Reject | Reject | Reject | Reject | Reject | Reject | Reject |
| Adhesion strength after 150° C. × 3000 hrs, kg/cm | Stainless | — | — | — | — | — | — | — | — | — | — | — | — |
| | Copper | — | — | — | — | — | — | — | — | — | — | — | — |
| | Iron | — | — | — | — | — | — | — | — | — | — | — | — |
| | Aluminum | — | — | — | — | — | — | — | — | — | — | — | — |

TABLE 7-continued

|  | Comp. Ex. 45 | Comp. Ex. 46 | Comp. Ex. 47 | Comp. Ex. 48 | Comp. Ex. 49 | Comp. Ex. 50 | Comp. Ex. 51 | Comp. Ex. 52 | Comp. Ex. 53 | Comp. Ex. 54 | Comp. Ex. 55 | Comp. Ex. 56 |
|---|---|---|---|---|---|---|---|---|---|---|---|---|
| Evaluation of waterproofness after deterioration | Reject | Reject | Reject | Reject | Reject | Reject | Reject | Reject | Reject | Reject | Reject | Reject |

(Note)
(*1) PVdF-2 Product of Mitsubishi Chemical Corporation, trade name "KYNAR 7200" [melting point = 120° C., MFR = 2 g/min (measured at a temperature of 230° C. under a load of 2.16 kg)],
(*2) FKM-2: Product of Du Pont, trade name "Viton B-50" [fluorine content = 68%, Mooney viscosity ($ML_{1+10}$, 121° C.) = 30].

Comparative Examples 57 to 68

Samples for evaluation of adhesive composition and multi-layer heat-shrinkable tubes were produced in the same manner as in Example 1 except that the kinds and combination of the fluorine-containing polymers used in the adhesive composition, the kind and proportion of the polar group-containing unsaturated compound blended, and the quantity of the accelerated electron rays irradiated were changed so as to be shown in Table 8, and evaluation was made in the same manner as in Example 1. In each of the adhesive compositions prepared above, 0.5 parts by weight of pentaerythritol-tetrakis[3-(3,5-di-t-butyl-4-hydroxyphenyl)propionate] as an antioxidant were incorporated into 100 parts by weight of the fluorine-containing polymer though not shown in Table 8.

revealed that rejection is given in all cases of the evaluation as to the initial waterproofness. It was found that all these multi-layer heat-shrinkable tubes are also rejected in the evaluation of waterproofness after the deterioration at 150° C. for 3,000 hours.

On the other hand, some of the adhesive compositions according to Comparative Examples 63 to 68, in which the quantity of the electron rays irradiated was great, had good initial adhesion strength, and the multi-layer heat-shrinkable tubes having, as the inner layer, these adhesive compositions also had good initial waterproofness. However, these adhesive compositions were markedly lowered in adhesion strength after the deterioration at 150° C. for 3,000 hours, and the waterproofness of the heat-shrinkable tubes was also given rejection. The results are shown in Table 8.

TABLE 8

|  |  | Comp. Ex. 57 | Comp. Ex. 58 | Comp. Ex. 59 | Comp. Ex. 60 | Comp. Ex. 61 | Comp. Ex. 62 | Comp. Ex. 63 | Comp. Ex. 64 | Comp. Ex. 65 | Comp. Ex. 66 | Comp. Ex. 67 | Comp. Ex. 68 |
|---|---|---|---|---|---|---|---|---|---|---|---|---|---|
| PVdF-1 (*1) |  | 100 | 70 | 40 | — | 30 | 80 | 100 | — | 60 | 50 | 80 | 30 |
| FKM-2 (*2) |  | — | 30 | 60 | 100 | 70 | 20 | — | 100 | 40 | 50 | 20 | 70 |
| Glycidyl methacrylate |  | 20 | 15 | — | — | — | — | 5 | 15 | — | — | — | — |
| Diallylmonoglycidyl isocyanate |  | — | — | 3 | 30 | — | — | — | — | 30 | 20 | — | — |
| Maleic anhydride |  | — | — | — | — | 10 | 15 | — | — | — | — | 10 | 20 |
| Quantity of electron rays | kGy | 15 | 10 | 18 | 17 | 10 | 5 | 900 | 850 | 730 | 750 | 800 | 730 |
| Initial adhesion strength, kg/cm | Stainless | 0.6 | 0.5 | 0.9 | 0.8 | 0.6 | 0.7 | 0.9 | 1.0 | 1.5 | 1.4 | 1.1 | 1.7 |
|  | Copper | 0.3 | 0.4 | 0.8 | 0.9 | 0.7 | 0.7 | 0.6 | 0.8 | 1.4 | 1.6 | 1.0 | 1.6 |
|  | Iron | 0.5 | 0.4 | 0.9 | 0.6 | 0.7 | 0.5 | 0.5 | 0.9 | 1.6 | 1.3 | 1.0 | 1.6 |
|  | Aluminum | 0.5 | 0.4 | 0.6 | 0.8 | 0.4 | 0.8 | 0.7 | 0.8 | 1.5 | 1.5 | 1.2 | 1.3 |
| Evaluation of initial waterproofness by heat-shrinkable tube |  | Reject | Reject | Reject | Reject | Reject | Reject | Reject | Reject | Acpt. | Acpt. | Acpt. | Acpt. |
| Adhesion strength after 150° C. × 3000 hrs, kg/cm | Stainless | — | — | — | — | — | — | — | 0.2 | 0.6 | 0.4 | 0.3 | 0.6 |
|  | Copper | — | — | — | — | — | — | — | — | 0.3 | 0.3 | 0.2 | 0.4 |
|  | Iron | — | — | — | — | — | — | — | — | 0.6 | 0.4 | 0.2 | 0.4 |
|  | Aluminum | — | — | — | — | — | — | — | — | 0.6 | 0.5 | 0.3 | 0.4 |
| Evaluation of waterproofness after deterioration |  | Reject | Reject | Reject | Reject | Reject | Reject | Reject | Reject | Reject | Reject | Reject | Reject |

(Note)
(*1) PVdF-1 Product of Mitsubishi Chemical Corporation, trade name "KYNAR 9300" [melting point = 100° C., MFR = 120 g/min (measured at a temperature of 190° C. under a load of 2.16 kg)],
(*2) FKM-2: Product of Du Pont, trade name "Viton B-50" [fluorine content = 68%, Mooney viscosity ($ML_{1+10}$, 121° C.) = 30].

As the result, the adhesive compositions according to Comparative Examples 57 to 62, in which the quantity of the electron rays irradiated was small, each had initial adhesion strength lower than 1.0 kg/cm, and could not sufficiently fulfill a function as an adhesive. With respect to these compositions, thus, the evaluation of the adhesion strength after the deterioration at 150° C. for 3,000 hours was not conducted.

The test for the waterproofness using the multi-layer heat-shrinkable tube having, as the inner layer, each of the compositions according to Comparative Examples 57 to 62

Example 25

A radiation-crosslinking composition obtained by blending 1 part by weight of trimethylolpropane trimethacrylate with 100 parts by weight of a thermoplastic fluororesin [product of Sumitomo 3M Limited, trade name "Dyneon THV220G"; melting point=110 to 130° C., MFR=20 g/10 min (measured at a temperature of 250° C. under a load of 5 kg)] was poured into a melt-extruder for outer layer (40 mm in diameter; Hastelloy-worked full-flight type). On the other hand, the pellets of the composition prepared in Example 1 and containing the ternary polyvinylidene fluoride copolymer, glycidyl methacrylate and the antioxidant were poured into a melt-extruder for inner layer (30 mm in diameter; Hastelloy-worked full-flight type). The respective compositions were melt-extruded through a cross head for two-layer extrusion at an extrusion temperature of 230° C., thereby forming a tube of a 2-layer structure having an inner diameter of 2.5 mm, an outer diameter of 6.5 mm and an inner layer thickness of 1.0 mm. This tube was irradiated with 60 kGy of electron rays of acceleration voltage of 2 MeV to crosslink the outer layer and graft-modify the inner layer.

The crosslinked tube was left to stand for 3 minutes in a thermostatic chamber preset to 150° C. to preheat it, and then expanded by a method of blowing compressed air into an interior cavity of the tube until the inner diameter reached 6.5 mm. Thereafter, the tube was immediately taken out of the thermostatic chamber and cooled and solidified with water to fix the form, thereby obtaining a multi-layer heat-shrinkable tube (FIG. 1).

This heat-shrinkable tube was cut into lengths of 30 mm, and as illustrated in FIG. 2, a columnar rod made of a tetrafluoroethylene resin having an outer diameter of 6.0 mm was covered with the tube so as to cover a 20-mm length of the rod. The rod covered with the tube was dipped 3 minutes in a high-temperature vessel of 150° C. to shrink the tube to produce a heat-shrinkable cap in a form that the internal layer material (adhesive composition) of the heat-shrunk portion is melted and sealed as illustrated in FIG. 3.

<Evaluation of Waterproofness>

The cover of a fluororesin-coated cable (ARX-3KAI) manufactured by Sumitomo Electric Industries, Ltd. and having an outer diameter of 1.48 mm (conductor=11/0.16, thickness=0.43 mm) was removed to 5 mm at an end portion thereof, and conductors of 3 wires were crimped and fixed by means of a crimp sleeve (outer diameter: 4.0 mm) made of a metal. As illustrated in FIG. 4, the end portion of the fluororesin-coated cable was covered with the heat-shrinkable cap produced above, and the heat-shrinkable cap was left to stand for 3 minutes in a high-temperature vessel of 150° C. to heat-shrink the cap, thereby obtaining a joint sample.

After this joint sample was placed in a water vessel containing a 5% aqueous solution of sodium chloride, and left to stand for 1 hour at room temperature, a DC voltage of 500 V was applied between the conductor of the cable and a counter electrode provided in the water vessel to measure an insulation resistance. As a result, it was confirmed that the insulation resistance was at least 100 MΩ, and sufficient air-tightness can be retained. This joint sample was subjected to a deterioration test under conditions of 150° C. for 3,000 hours, and an insulation resistance was measured in the same manner as described above. As a result, it was found that the insulation resistance of at least 100 MΩ is retained, and so the joint sample is excellent in waterproofness even after the deterioration.

INDUSTRIAL APPLICABILITY

The adhesive compositions according to the present invention can be hot-melted and are excellent in adhesive property to various adherends including metallic adherends and heat resistance. The adhesive compositions, and multi-layer heat-shrinkable tubes and heat-shrinkable caps according to the present invention can be suitably applied to protection of electric wires, wire harnesses and pipes, of which high heat resistance that a continuous service temperature is at least 150° C. is required, and hermetic sealing of joints and ends.

The adhesive compositions according to the present invention, and formed products having a layer of the adhesive composition, such as multi-layer heat-shrinkable tubes and heat-shrinkable caps, are suitable for use in protection or connection of parts used in automobiles, aircrafts, space industries, or the like, of which high heat resistance is required, and in imparting waterproofness thereto.

The invention claimed is:

1. A process for producing a multi-layer heat-shrinkable tube comprising a hot-melt adhesive inner layer, which process comprises the following steps:
co-extruding a radiation-crosslinking composition and a fluorine-containing polymer composition into a 2-layer tube-shaped product having an outer layer composed of the radiation-crosslinking composition and an inner layer composed of the fluorine-containing polymer composition, wherein the radiation-crosslinking composition comprises a fluorine-containing polymer and a polyfunctional monomer, and wherein the fluorine-containing polymer composition comprises 100 parts by weight of a fluorine-containing polymer and 2 to 30 parts by weight of an unsaturated compound containing at least one polar group selected from the group consisting of an epoxy group and a carboxyl group;
irradiating the tube-shaped product with ionizing radiation to concurrently crosslink the radiation-crosslinking composition of the outer layer and graft-modify the fluorine-containing polymer composition of the inner layer, wherein the fluorine-containing polymer of the fluorine-containing polymer composition is graft-modified with the unsaturated compound;
expanding the irradiated tube-shaped product in a radial direction thereof under heating; and
cooling the expanded tube-shaped product to fix the expanded tube-shaped product,
wherein a degree of graft-modification is controlled by adjusting a proportion of the unsaturated compound and a quantity of said ionizing radiation.

2. The process according to claim 1, wherein the fluorine-containing polymer composition further comprises an antioxidant in a proportion of 0.1 to 5 parts by weight per 100 parts by weight of the fluorine-containing polymer.

3. The process according to claim 1, wherein the fluorine-containing polymer of the fluorine-containing polymer composition is at least one polymer selected from the group consisting of a fluororesin and a fluororubber.

4. The process according to claim 3, wherein the fluororesin has a melting point not lower than 80° C., but lower than 140° C., and wherein the fluororubber has a Mooney viscosity ($ML_{1+10}$, 121° C.) of 5 to 70.

5. The process according to claim 3, wherein the fluorine-containing polymer of the fluorine-containing polymer composition is at least one fluororubber selected from the group consisting of copolymer rubber (VdF-HFP fluororubber) of vinylidene fluoride (VdF) and hexafluoropropylene (HFP), terpolymer rubber (VdF-HFP-TFE fluororubber) of vinylidene fluoride (VdF), hexafluoropropylene (HFP) and tetrafluoroethylene (TFE), copolymer rubber (VdF-PFP fluororubber) of vinylidene fluoride (VdF) and pentafluoropropylene (PFP), terpolymer rubber (VdF-PFP-TFE fluororubber) of vinylidene fluoride (VdF), pentafluoropropylene (PFP) and tetrafluoroethylene (TFE), terpolymer rubber (VdF-PFMVE-TFE fluororubber) of vinylidene fluoride (VdF), perfluoromethyl vinyl ether (PFMVE) and tetrafluoroethylene (TFE), copolymer rubber (VdF-CTFE fluororubber) of vinylidene fluoride (VdF) and chlorotrifluoroethylene (CTFE), copolymer rubber (TFE-P fluororubber) of tetrafluoroethylene (TFE) and propylene (P), and thermoplastic fluororubber.

6. The process according to claim 1, wherein the fluorine-containing polymer of the fluorine-containing polymer composition is at least one fluororesin selected from the group consisting of polyvinylidene fuoride (PVdF), binary copolymers (VdF-TFE copolymers) of vinylidene fluoride (VdF) and tetrafluoroethylene (TFE), binary copolymers (VdF-HFP copolymers) of vinylidene fluoride (VdF) and hexafluoropropylene (HFP), ternary copolymers (VdF-TFE-IWP terpolymers) of vinylidene fluoride (VdF), tetrafluoroethylene (TFE) and hexafluoropropylene (HFP), copolymers (ETFEs) of ethylene and tetrafluoroethylene (TFE), copolymers (ECTFEs) of ethylene and chlorotrifluoroethylene (CTFE), copolymers (FEPs) of tetrafluoroethylene (TFE) and hexafluoropropylene (HFP), and copolymers (PFAs) of tetrafluoroethylene (TFE) and a perfluoroalkyl vinyl ether.

7. The process according to claim 1, wherein the unsaturated compound is an epoxy group-containing unsaturated compound selected from the group consisting of glycidyl esters of unsaturated carboxylic acids, allylglycidyl isocyanates, monoglycidyl or polyglycidyl esters of unsaturated polycarboxylic acids, and allyl glycidyl ethers.

8. The process according to claim 7, wherein the glycidyl ester of the unsaturated carboxylic acid is glycidyl methacrylate, and wherein the allylglycidyl isocyanate is diallylmonoglycidyl isocyanate.

9. The process according to claim 1, wherein the unsaturated compound is a carboxyl group-containing unsaturated compound selected from the group consisting of unsaturated carboxylic acids, anhydrides of unsaturated dicarboxylic acids, and anhydrides of unsaturated carboxylic acids.

10. The process according to claim 9, wherein the anhydride of the unsaturated dicarboxylic acid is maleic anhydride.

* * * * *